(12) United States Patent
Shibutani et al.

(10) Patent No.: US 9,321,405 B2
(45) Date of Patent: Apr. 26, 2016

(54) ROOF RAIL

(71) Applicant: AISIN SEIKI KABUSHIKI KAISHA, Kariya-shi, Aichi-ken (JP)

(72) Inventors: Yukihide Shibutani, Nagoya (JP); Shinichi Haneda, Anjo (JP); Yoshiteru Taniguchi, Aichi-ken (JP); Yasushiro Shibata, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/227,220

(22) Filed: Mar. 27, 2014

(65) Prior Publication Data

US 2014/0292040 A1 Oct. 2, 2014

(30) Foreign Application Priority Data

Mar. 28, 2013 (JP) ................................. 2013-068861

(51) Int. Cl.
  *B60R 9/052* (2006.01)
  *B60R 9/048* (2006.01)
(52) U.S. Cl.
  CPC ..................................... *B60R 9/048* (2013.01)
(58) Field of Classification Search
  CPC ...... B62D 35/007; B62D 37/02; B60R 11/04; B60R 2011/004; B60R 9/048; B60N 3/026; B60N 2/0705; B60N 2/0722; B60N 2/0818; B60N 2/0881; B60N 2/42763; B60N 3/02
  USPC ............ 296/180.1, 210, 187.12, 193.06, 191, 296/146.5, 203.01, 203.03, 146.6; 348/148
  See application file for complete search history.

(56) References Cited

U.S. PATENT DOCUMENTS

| | | | | |
|---|---|---|---|---|
| 5,016,799 A | * | 5/1991 | Stapleton | B60R 9/04 224/309 |
| 5,884,824 A | * | 3/1999 | Spring, Jr. | B60R 9/042 224/309 |
| 6,729,513 B2 | * | 5/2004 | Kmita | B60R 9/00 224/316 |
| 7,914,189 B2 | * | 3/2011 | Sugiura | B60Q 1/2611 362/493 |
| 8,333,311 B2 | * | 12/2012 | Hubbard | B60R 9/058 224/320 |
| 2009/0314815 A1 | * | 12/2009 | Stapleton | B60R 9/045 224/330 |
| 2012/0273535 A1 | * | 11/2012 | Aftanas | B60R 9/04 224/309 |

(Continued)

FOREIGN PATENT DOCUMENTS

JP 2001-239892 9/2001
JP 2009-298230 12/2009

*Primary Examiner* — Glenn Dayoan
*Assistant Examiner* — Sunsurraye Westbrook
(74) *Attorney, Agent, or Firm* — Finnegan, Henderson, Farabow, Garrett & Dunner, LLP (57) ABSTRACT

A roof rail includes a support member configured to be assembled on a roof of a vehicle, a first cover made from synthetic resin material, the first cover including a lengthwise-direction first end portion which is fixed to the support member and a lengthwise-direction second end portion which is supported by the support member to be expandable and contractible in a vehicle front/rear direction, and a second cover made from synthetic resin material, the second cover being supported by the support member to be expandable and contractible in the vehicle front/rear direction, the second cover including a lengthwise-direction end portion which is assembled to the lengthwise-direction second end portion of the first cover, wherein an outer surface of the lengthwise-direction second end portion of the first cover and an outer surface of the lengthwise-direction end portion of the second cover are coplanar with each other.

7 Claims, 7 Drawing Sheets

(56) References Cited

U.S. PATENT DOCUMENTS

2012/0292950 A1* 11/2012 Stahlhut ................ B62D 25/06 296/210

2012/0299334 A1* 11/2012 Takayama .............. B62D 25/02 296/193.06

2013/0008931 A1* 1/2013 Wang ...................... B60R 9/045 224/315

* cited by examiner

ROOF RAIL

CROSS REFERENCE TO RELATED APPLICATIONS

This application is based on and claims priority under 35 U.S.C. §119 to Japanese Patent Application 2013-068861, filed on Mar. 28, 2013, the entire content of which is incorporated herein by reference.

TECHNICAL FIELD

This disclosure generally relates to a roof rail.

BACKGROUND DISCUSSION

As described in, for example, JP2001-239892A (hereinafter referred to as Patent reference 1), a roof rail which is assembled on a roof upper surface of a vehicle is known. The known roof rail of Patent reference 1 includes a roof rail main body which is arranged to be extended in a vehicle front/rear direction and a cap which is assembled to a front end portion of the roof rail main body. Each of the roof rail main body and the cap is made from synthetic resin material. The cap is formed to have a hollow. An opening portion is provided at a rear end portion of the cap. The front end portion of the roof rail main body is inserted in the cap from the opening portion. Thus, the front end portion of the roof rail main body is covered with the cap. According to this configuration, a front end of the roof rail main body is expandable and contractible in the front/rear direction in the cap in a case where the roof rail main body is expanded and/or contracted in the vehicle front/rear direction due to changes in an ambient temperature. As a result, the front end of the roof rail main body and the opening portion of the cap are restricted from being away from each other in the vehicle front/rear direction in such a way that the front end of the roof rail main body comes to be positioned rearward relative to the opening portion of the cap. That is, it is restricted that a gap is formed between the roof rail main body and the cap.

According to the known roof rail of Patent reference 1, a step is formed at a boundary portion between the roof rail main body and the cap. Thus, an external appearance of the roof rail is impaired. In addition, an air flow, which is generated on or above the roof while the vehicle is running, impacts or collides with the step, and thus wind noise may be generated.

A need thus exists for a roof rail which is not susceptible to the drawback mentioned above.

SUMMARY

According to an aspect of this disclosure, a roof rail includes a support member which is formed to be extended in a vehicle front/rear direction and is configured to be assembled on an upper surface of a roof of a vehicle, a first cover which is made from synthetic resin material and is formed to be extended in the vehicle front/rear direction, the first cover including a lengthwise-direction first end portion which is fixed to the support member and a lengthwise-direction second end portion which is supported by the support member to be expandable and contractible in the vehicle front/rear direction, and a second cover which is made from synthetic resin material and is formed to be extended in the vehicle front/rear direction, the second cover being supported by the support member to be expandable and contractible in the vehicle front/rear direction, the second cover including a lengthwise-direction end portion which is assembled to the lengthwise-direction second end portion of the first cover, wherein an outer surface of the lengthwise-direction second end portion of the first cover and an outer surface of the lengthwise-direction end portion of the second cover are coplanar with each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
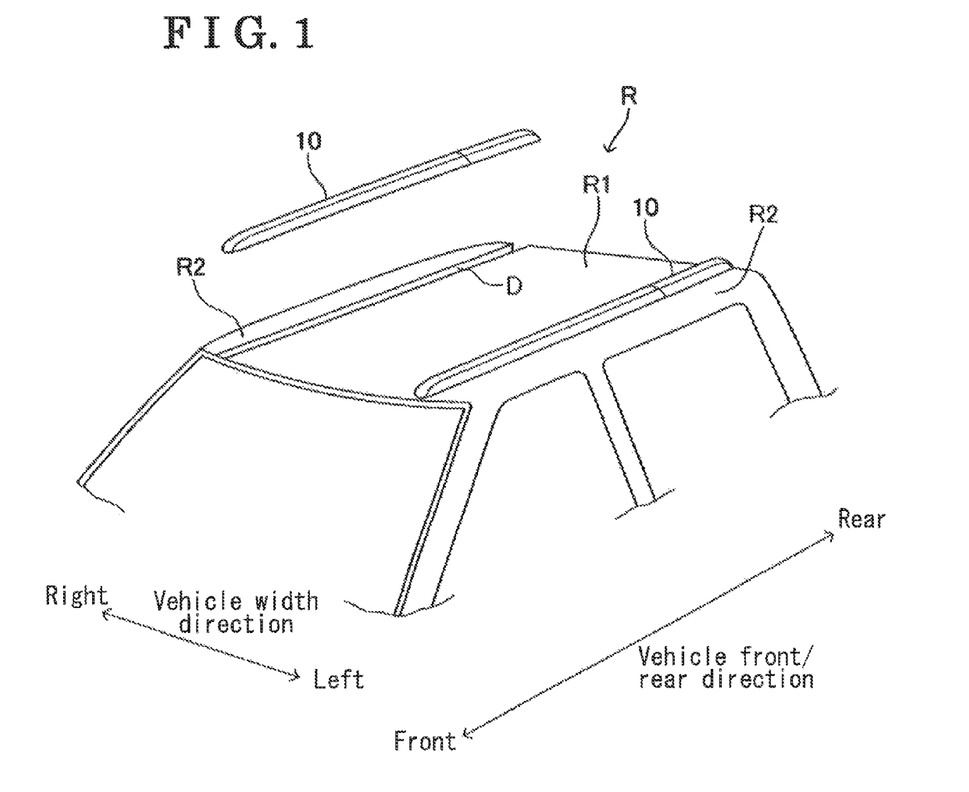
FIG. 1 is a schematic view illustrating a roof of a vehicle on which a roof rail according to an embodiment disclosed here is assembled.

A roof rail 10 related to an embodiment disclosed here will be described. First, a configuration of a roof R of a vehicle on which the roof rail 10 is assembled, will be described. The roof R includes a main panel R1, a side panel R2 and an inner panel R3, which are joined to one another, and each of which is formed in a plate shape (refer to FIGS. 1 and 6). Because the roof R is formed and arranged to be left-right symmetrical centered on a central portion of the roof R in a vehicle width direction, a portion of the roof R on the right side will be described hereunder, and explanation on a portion thereof on the left side will be omitted. The main panel R1 is formed to cover a central portion of a vehicle cabin in the vehicle width direction. The side panel R2 is formed to cover a right end portion of the vehicle cabin. A stepped portion R11 which is formed in a stepwise configuration is provided at a right end portion of the main panel R1 in the vehicle width direction. A flange portion R12 is provided at a lower end of the stepped portion R11. Each of the stepped portion R11 and the flange portion R12 is formed to be extended in a vehicle front/rear direction. A right end portion of the main panel R1 is bent downwardly, and thus each of the stepped portion R11 and the flange portion R12 is formed. A stepped portion R21 and a flange portion R22, which are similar to the stepped portion R11 and the flange portion R2, respectively, are provided at a left end portion of the side panel R2. In addition, the inner panel R3 is arranged below the main panel R1 and the side panel R2. The flange portion R12, the flange portion R22 and the inner panel R3 are welded to one another in a state where the flange portion R12, the flange portion R22 and the inner panel R3 are overlapped with one another, and thus a groove portion D is formed or defined at an upper surface of the roof R. The groove portion D is formed to be extended in the vehicle front/rear direction and to open upwardly. The roof rail 10 is placed over the groove portion D in a manner that the groove portion D is covered with the roof rail 10.

Figure 2:
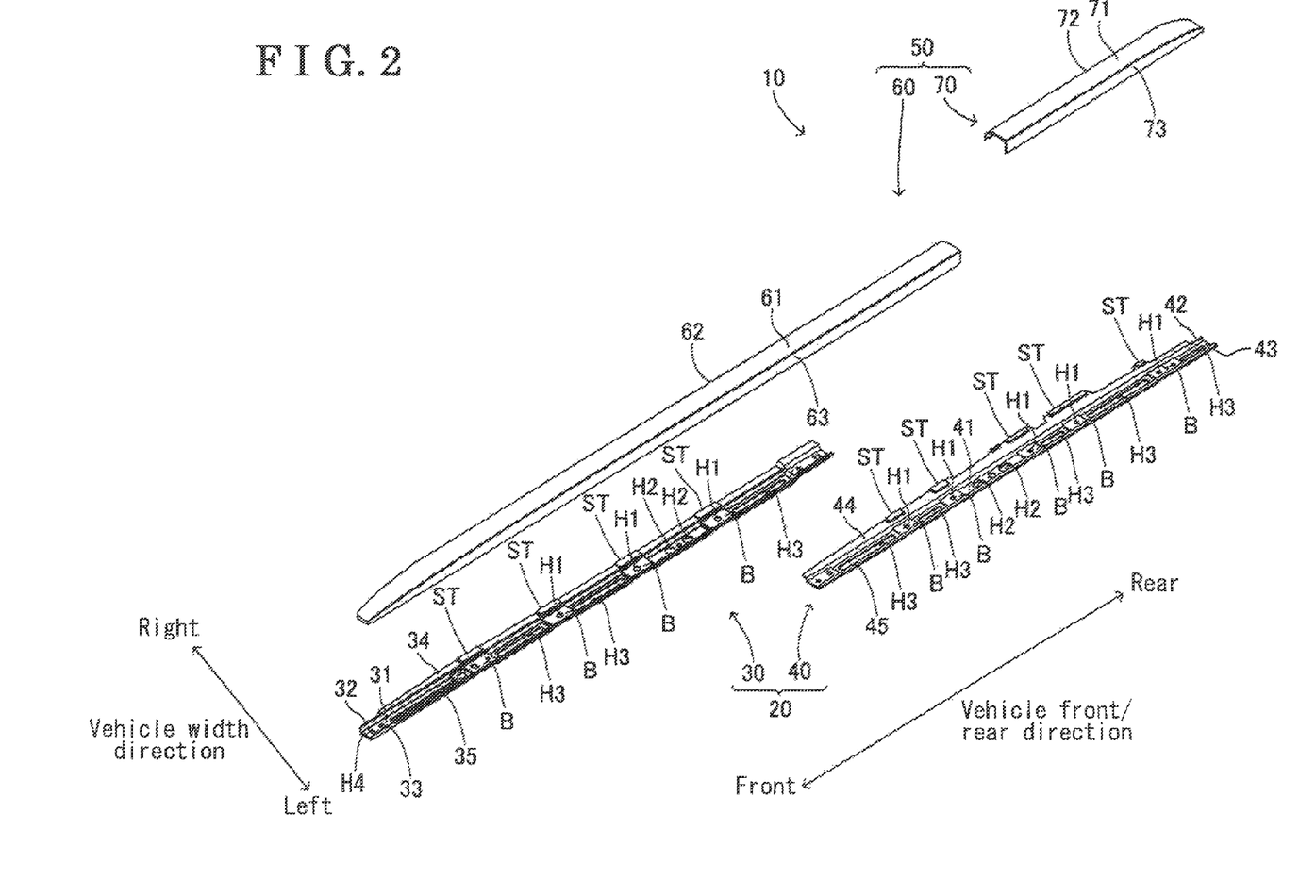
FIG. 2 is an exploded perspective view of the roof rail.

As illustrated in FIG. 2, the roof rail 10 includes a support member 20 which is assembled on the groove portion D and a cover member 50 which is placed over the support member 20 in a manner that the support member 20 is covered with the cover member 50. The support member 20 includes a front support member 30 and a rear support member 40 each of which is formed to be extended in the vehicle front/rear direction. A front end portion of the rear support member 40 is connected to a rear end portion of the front support member 30, thereby forming the support member 20. A length of the front support member 30 in a lengthwise direction, that is, a longer direction, is substantially identical to a length of the rear support member 40 in the lengthwise direction. Each of the front support member 30 and the rear support member 40 is formed by press-working a metal plate formed in a band shape.

Figure 3:
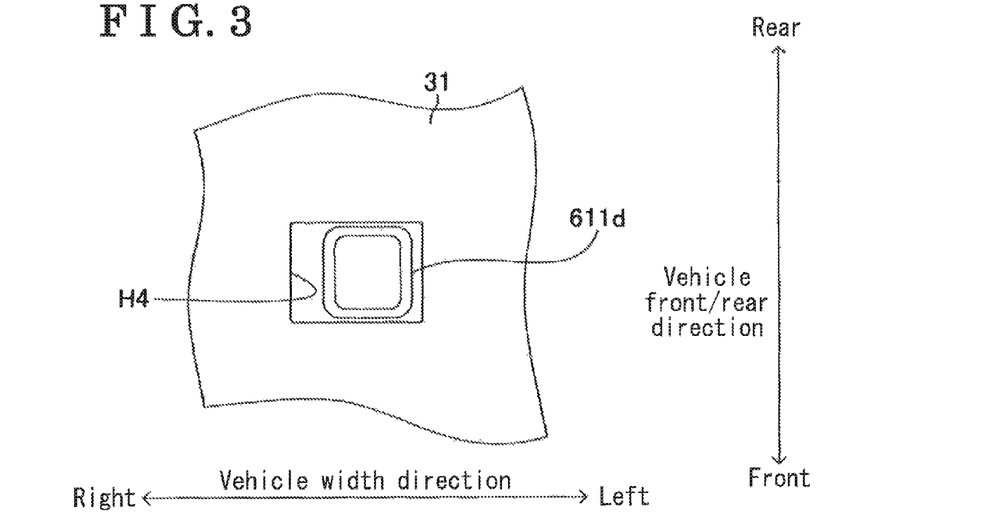
FIG. 3 is a bottom view of a positioning portion according to the embodiment.
Figure 4:
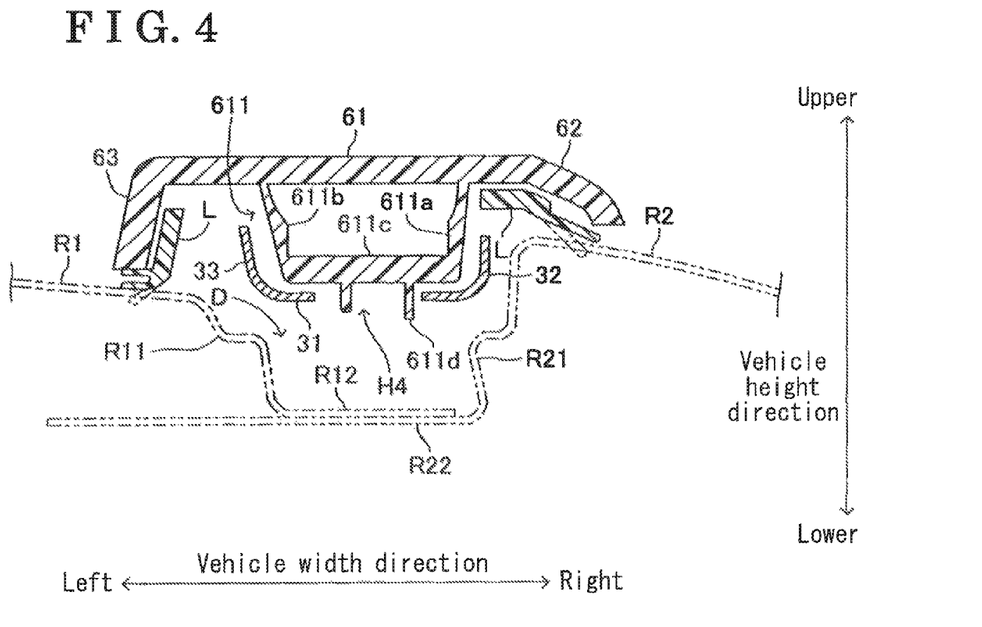
FIG. 4 is a cross-sectional view, which is orthogonal to a lengthwise direction of the roof rail and is seen from a rear, of the positioning portion of a cover member according to the embodiment.

The front support member 30 includes a bottom plate portion 31 which is extended in the vehicle front/rear direction. Plural base portions B which support the cover member 50 are provided at the bottom plate portion 31, The plural base portions B are arranged while a distance is provided therebetween in the vehicle front/rear direction. An upper surface of each of the base portions B is positioned slightly above relative to an upper surface of other portion (that is, the portion of the bottom plate portion 31, at which the base portions B are not provided) of the bottom plate portion 31. A through hole H1 which is formed to go through, that is, penetrate, the base portion B from the upper surface to an under surface thereof is provided at a central portion of each of the base portions B. A screw SC1, which is used for supporting the cover member 50, is inserted or screwed in each of the through holes H1. In addition, a through hole H2 and a through hole H3, for example, plural through holes H2 and plural through holes H3, are provided at the other portion of the bottom plate portion 31. A screw SC2 which is used for assembling the support member 20 on the roof R is screwed in the through hole H2. The through hole H3 is for reducing the weight of the support member 20. Each of the through hole H2 and the through hole H3 is formed in a shape that is elongated in the front/rear direction. In addition, as illustrated in FIGS. 3 and 4, a positioning hole H4 where a protruding portion 611d, which will be described later, of the cover member 50 is inserted is provided at a front end portion of the bottom plate portion 31.

Figure 5:
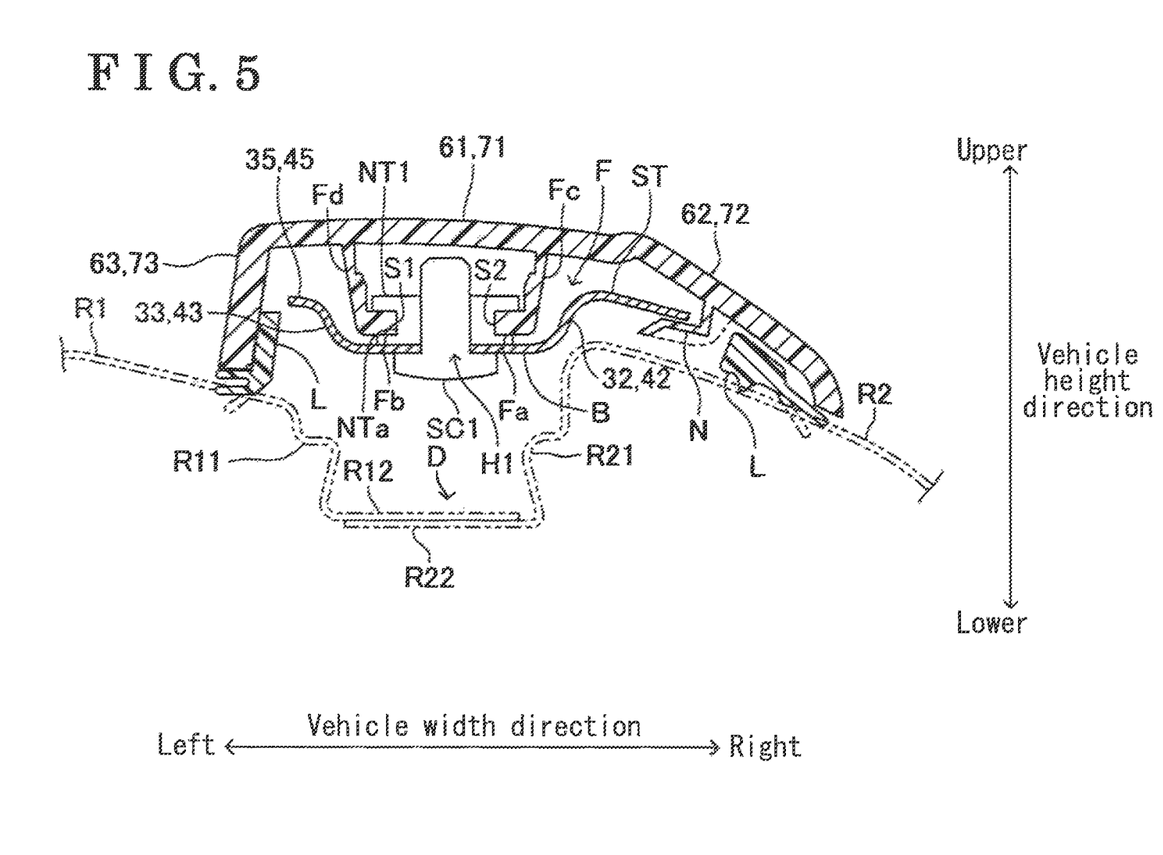
FIG. 5 is a cross-sectional view, which is orthogonal to the lengthwise direction of the roof rail and is seen from the rear, of a leg portion of the cover member.

In addition, the front support member 30 includes a side plate portion 32 which is formed to be extended upwardly from a right end portion of the bottom plate portion 31 and a side plate portion 33 which is formed to be extended upwardly from a left end portion of the bottom plate portion 31 (refer to FIGS. 2 and 5). A flange portion 34 which is extended in the vehicle front/rear direction is provided at an upper end of the side plate portion 32. A flange portion 35 which is extended in the vehicle front/rear direction is provided at an upper end of the side plate portion 33. A width of the flange portion 34 (that is, a length of the flange portion 34 in a direction that is orthogonal to a direction in which the flange portion 34 is extended) is larger than a width of the flange portion 35. Plural locking portions ST, each of which holds a tab portion N of the cover member 50, are provided at an end portion of the flange portion 34, at a vehicle outer side. The plural locking portions ST are arranged while a distance is provided therebetween in the vehicle front/rear direction. Each of the locking portions ST is formed in a manner that a part of a right end portion of the flange portion 34 is expanded and is raised upwardly.

The rear support member 40 includes a bottom plate portion 41, a side plate portion 42, a side plate portion 43, a flange portion 44 and a flange portion 45, which are similar to the bottom plate portion 31, the side plate portion 32, the side plate portion 33, the flange portion 34 and the flange portion 35, respectively. The locking portions ST are provided at a right end portion of the flange portion 44. The front end portion of the rear support member 40 is fastened to the rear end portion of the front support member 30 with a screw.

The cover member 50 is formed to be extended in the vehicle front/rear direction. The cover member 50 includes a front cover 60 (i.e., a first cover) and a rear cover 70 (i.e., a second cover). A length of the front cover 60 in the vehicle front/rear direction differs from a length of the rear cover 70 in the vehicle front/rear direction. The front cover 60 is placed over a front end portion-side of the support member 20 so as to cover the front end portion-side of the support member 20. The rear cover 70 is placed over a rear end portion-side of the support member 20 so as to cover the rear end portion-side of the support member 20. Each of the front cover 60 and the rear cover 70 is formed by injection molding of synthetic resin material. That is, each of the front cover 60 and the rear cover 70 is made of synthetic resin. The front cover 60 is longer than the front support member 30. The front cover 60 is formed to open in a downward direction and a rearward direction, and is placed over portion which is from a front end of the front support member 30 to the front end portion of the rear support member 40. The front cover 60 includes an upper wall portion 61 which is formed in a plate shape and is extended in the front/rear direction. The upper wall portion 61 is slightly curved so as to become lower towards a front end portion-side thereof. In addition, the front cover 60 includes a side wall portion 62 and a side wall portion 63 each of which is formed to be extended in the front/rear direction. An upper end portion of the side wall portion 62 is connected to a right end portion of the upper wall portion 61. A lower end portion of the side wall portion 62 is positioned at an outer side (that is, the right end-side of the roof R) relative to the upper end portion of the side wall portion 62. That is, the side wall portion 62 is inclined relative to an upper surface of the upper wall portion 61. On the other hand, an upper end portion of the side wall portion 63 is connected to a left end portion of the upper wall portion 61. The side wall portion 63 is substantially orthogonal to the upper surface of the upper wall portion 61.

A positioning portion 611, which determines a position of a front end portion of the cover member 50 relative to the support member 20 in the front/rear direction, is provided at an under surface of a front end portion of the upper wall portion 61 (refer to FIG. 4). The positioning portion 611 includes a side plate portion 611a and a side plate portion 611b each of which is formed to be extended downwardly from an under surface of the upper wall portion 61. The positioning portion 611 also includes a bottom plate portion 611c formed between a lower end portion of the side plate portion 611a and a lower end portion of the side plate portion 611b. In addition, the positioning portion 611 includes the protruding portion 611d which protrudes downwardly from an under surface of the bottom plate portion 611c. As illustrated in FIG. 3, the protruding portion 611d is formed in an annular shape when seen from below. A length of the protruding portion 611d in the vehicle front/rear direction is substantially equal to a length of the through hole H4, that is, the positioning hole H4, in the vehicle front/rear direction.

As illustrated in FIG. 5, plural leg portions F which are supported by the plural base portions B, respectively, are provided at the under surface of the upper wall portion 61. The plural leg portions F are arranged while a distance is provided therebetween in the vehicle front/rear direction. Each of the leg portions F includes a pair of bottom plate portions Fa, Fb each of which is formed in a plate shape that is parallel to the upper wall portion 61. The bottom plate Fa is arranged at the right side and the bottom plate portion Fb is arranged at the left side. A left end surface S2 of the bottom plate portion Fa and a right end surface S1 of the bottom plate portion Fb face each other. That is, a clearance is provided between the left end surface S2 and the right end surface S1. Each of the leg portions F includes side plate portions Fc, Fd each of which is formed to be extended downwardly from the under surface of the upper wall portion 61. The bottom plate portions Fa, Fb are connected to lower end portions of the side plate portions Fc, Fd, respectively.

Figure 6:
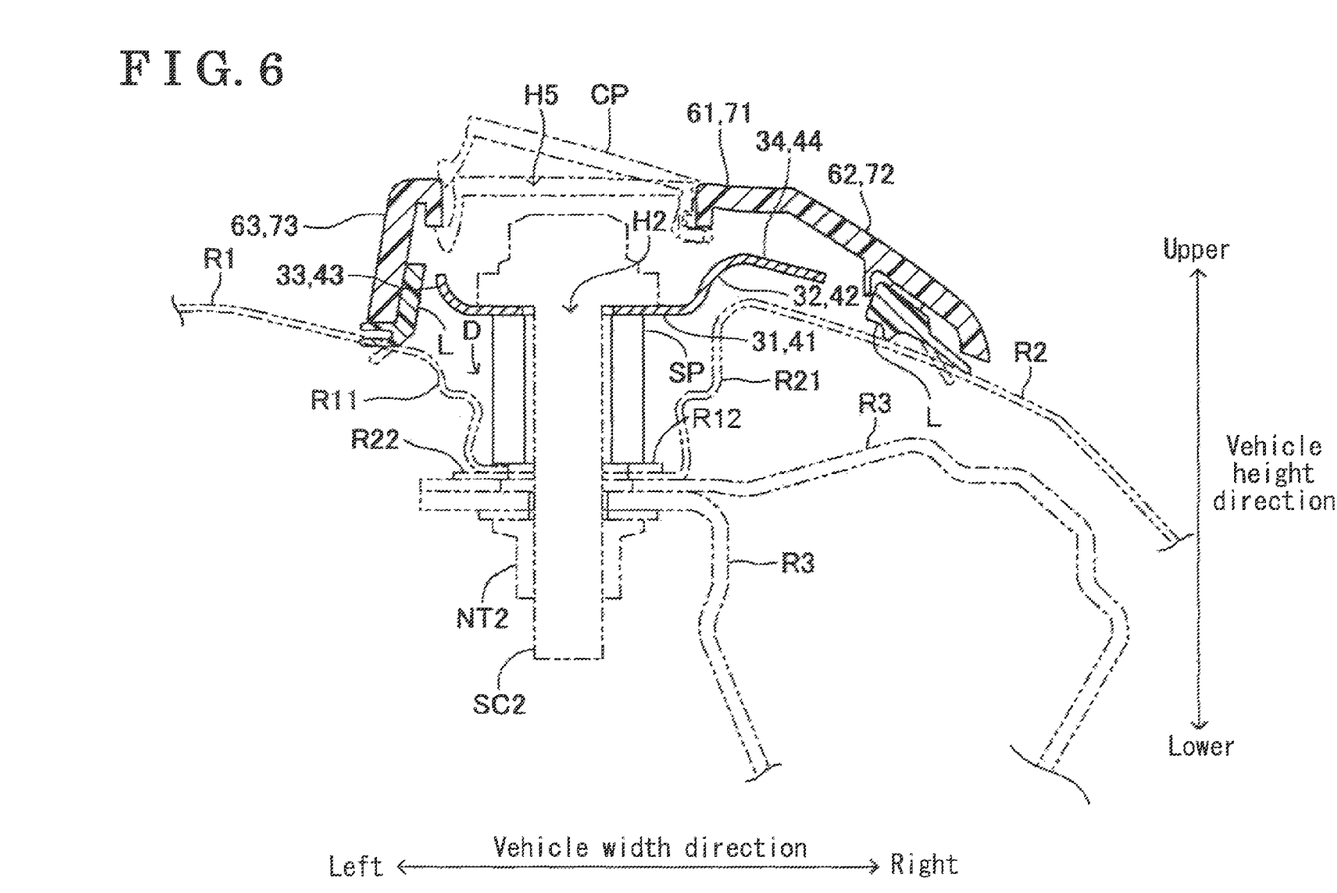
FIG. 6 is a cross sectional view, which is orthogonal to the lengthwise direction of the roof rail and is seen from the rear, of an attachment portion at which the roof rail is attached to the roof.

As illustrated in FIG. 6, the upper wall portion 61 includes a through hole H5 which is formed to go through the upper wall portion 61 from the upper surface to the under surface thereof. The through hole H5 is arranged to be positioned directly above the through hole H2 of the support member 20 in a state where the cover member 50 is assembled on the support member 20 (refer to FIG. 2). The through hole H5 is covered with a cap member CP. The cap member CP is removable relative to the upper wall portion 61.

A lip member L which is extended in the front/rear direction is adhered to an inner surface of each of the side wall portion 62 and the side wall portion 63. The lip member L is made from elastic or resilient material, including, but not limited to, synthetic rubber or synthetic resin. A lower end portion of the lip member L is positioned below a lower end surface of each of the side wall portion 62 and the side wall portion 63. In addition, the plural tab portions N which are locked at the plural locking portions ST, respectively, are provided at the inner side surface of the side wall portion 62.

Figure 7:
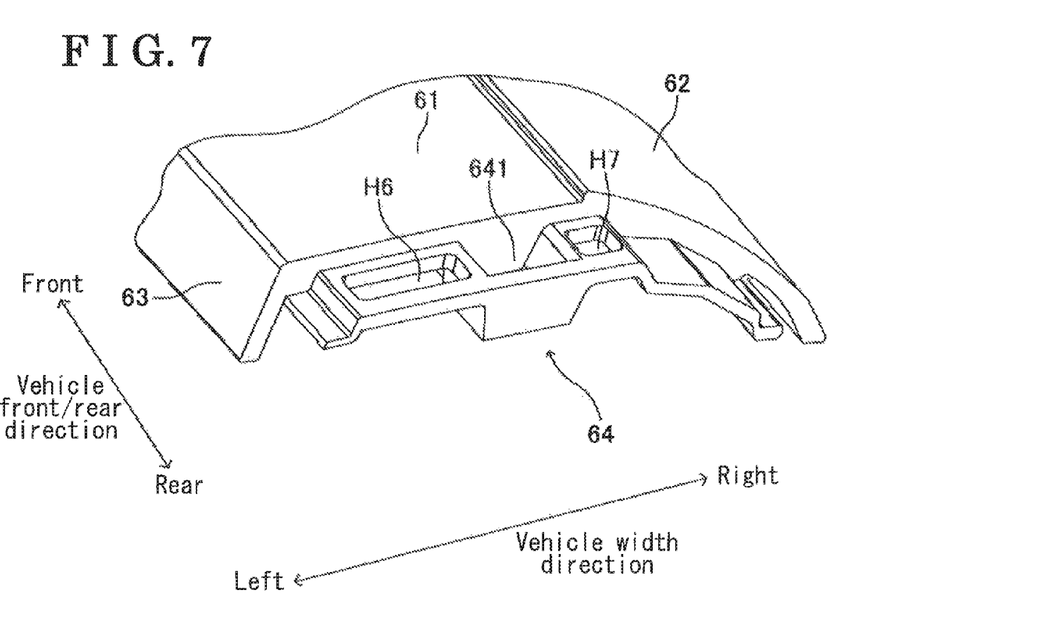
FIG. 7 is a perspective view of a rear end portion of a front cover according to the embodiment.

A fitting portion 64 is provided at a rear end portion of the front cover 60. A front end portion of the rear cover 70 is fitted to, that is, engages with the fitting portion 64. As illustrated in FIG. 7, the fitting portion 64 is formed to protrude from a rear end portion of the upper wall portion 61 and a rear end portion of the side wall portion 62. An upper surface of the fitting portion 64 is formed to match an under surface of the front end portion of the rear cover 70 in a case where the rear cover 70 engages with or is fitted to the front cover 60. The fitting portion 64 includes a through hole H6 (i.e., a first restriction portion), a through hole H7 (i.e., the first restriction portion) and a recessed portion 641 (i.e., a second restriction portion). The through hole H6 is formed at a left end portion of the fitting portion 64 so as to go through the fitting portion 64 from the upper surface to an under surface thereof. The through hole H7 is formed at a central portion of the fitting portion 64 in the vehicle width direction so as to go through the fitting portion 64 from the upper surface to the under surface thereof. The recessed portion 641 is provided between the through hole H6 and the through hole H7. The recessed portion 641 opens upwardly.

The rear cover 70 is placed over a rear end portion of the rear support member 40 so as to cover the rear end portion of the rear support member 40. A configuration of the rear cover 70 is substantially identical to the configuration of the front cover 60. The rear cover 70 includes an upper wall portion 71 which is formed in a plate shape and is extended in the front/rear direction, The upper wall portion 71 is slightly curved so as to become lower towards a rear end portion-side thereof. In addition, the rear cover 70 includes a side wall portion 72 and a side wall portion 73 each of which is formed to be extended in the front/rear direction. An upper end portion of the side wall portion 72 is connected to a right end portion of the upper wall portion 71. A lower end portion of the side wall portion 72 is positioned at an outer side (that is, the right end-side of the roof R) relative to the upper end portion of the side wall portion 72. That is, the side wall portion 72 is inclined relative to an upper surface of the upper wall portion 71. On the other hand, an upper end portion of the side wall portion 73 is connected to a left end portion of the upper wall portion 71. The side wall portion 73 is substantially orthogonal to the upper surface of the upper wall portion 71. That is, the rear cover 70 is formed to open in a forward direction and the downward direction.

In addition, the plural leg portions F are provided at an under surface of the upper wall portion 71. The lip member L is adhered to an inner surface of each of the side wall portion 72 and the side wall portion 73. In addition, the plural tab portions N are provided at the inner side surface of the side wall portion 72.

Figure 8:
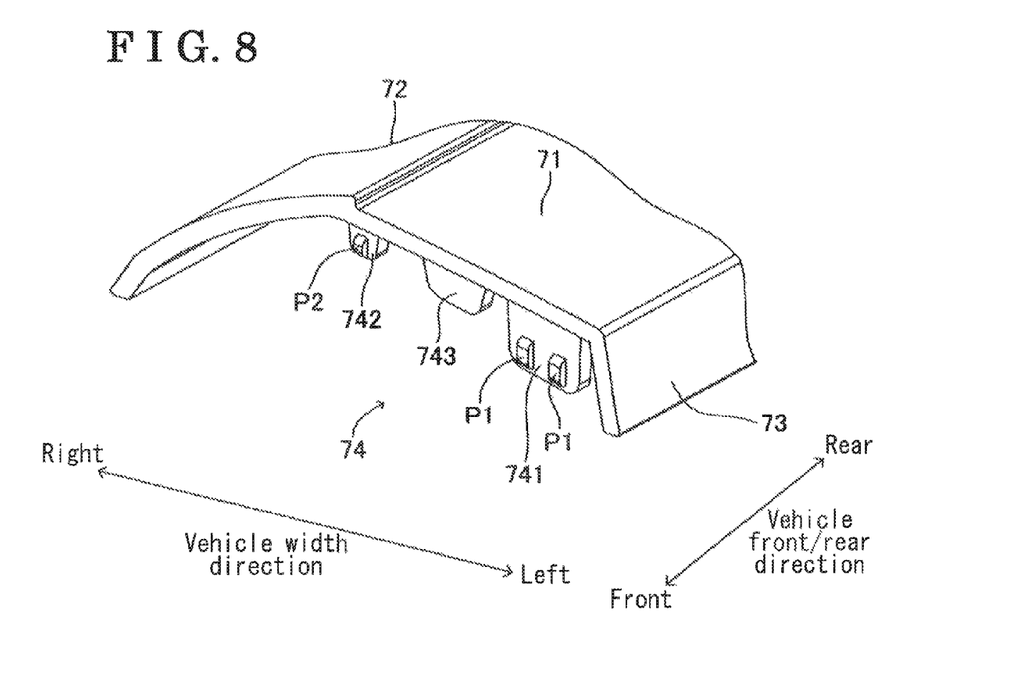
FIG. 8 is a perspective view of a front end portion of a rear cover according to the embodiment.

A fitting portion 74 is provided at the front end portion of the rear cover 70. The fitting portion 74 is fitted to, that is, engages with the fitting portion 64 of the front cover 60. As illustrated in FIG. 8, the fitting portion 74 is formed at a front end portion of the upper wall portion 71 to protrude downwardly from an under surface of the front end portion of the upper wall portion 71. The fitting portion 74 includes a locking piece 741 (i.e., the first restriction portion), a locking piece 742 (i.e., the first restriction portion) and a locking piece 743 (i.e., the second restriction portion), which are fitted by insertion in the through hole H6, the through hole H7 and the recessed portion 641 of the front cover 60, respectively. Each of the locking piece 741, the locking piece 742 and the locking piece 743 is formed in a plate shape. The locking piece 741 is provided at a left end portion of the front end portion of the rear cover 70. A protruding portion P1 which protrudes in the forward direction is provided at a lower end portion of a front surface of the locking piece 741. In this embodiment, for example, two of the protruding portions P1 are provided. The locking piece 742 is provided at a central portion, in the vehicle width direction, of the front end portion of the rear cover 70. A protruding portion P2 which protrudes in the forward direction is provided at a lower end portion of a front surface of the locking piece 742. The locking piece 743 is provided between the locking piece 741 and the locking piece 742. A width of the locking piece 743 in the front/rear direction (that is, a thickness of the locking piece 743) is equal to a width of the recessed portion 641 in the front/rear direction.

Figure 9:
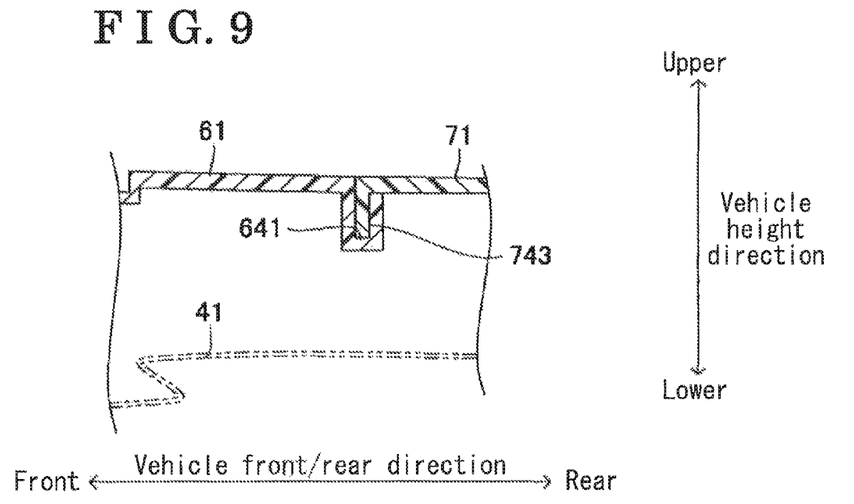
FIG. 9 is a cross-sectional view, which is taken along the lengthwise direction of the roof rail, illustrating a fitting portion in a state where a locking piece is inserted in a recessed portion according to the embodiment.
Figure 10:
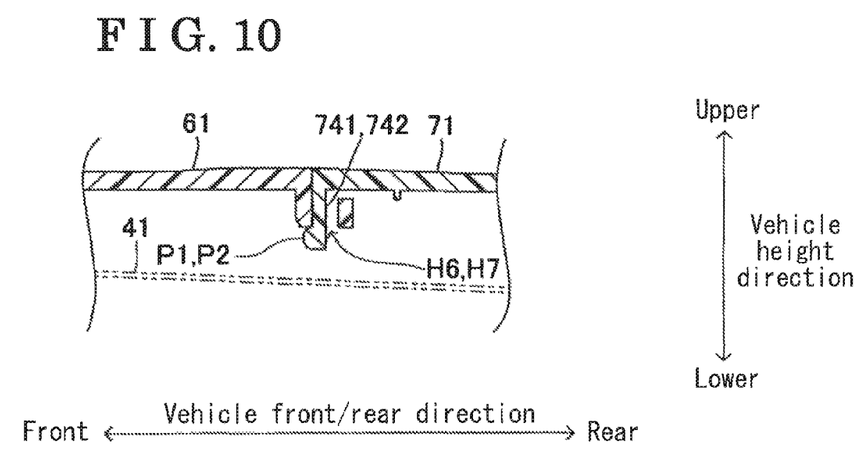
FIG. 10 is a cross-sectional view, which is taken along the lengthwise direction of the roof rail, illustrating the fitting portion in a state where a locking piece is inserted in a through hole according to the embodiment.

By bringing the front end portion of the rear cover 70 closer to the rear end portion of the front cover 60 from above, and by inserting the locking piece 741, the locking piece 742 and the locking piece 743 into the through hole H6, the through hole H7 and the recessed portion 641, respectively, the front cover 60 and the rear cover 70 are fitted with each other (refer to FIGS. 9 and 10). In a state where the locking piece 741 and the locking piece 742 are fitted by insertion in the through hole H6 and the through hole H7, respectively, the protruding portions P1 are in contact with an under surface of a front-side wall portion of the through hole H6, which is one of wall portions that form the through hole H6, and the protruding portion P2 is in contact with an under surface of a front-side wall portion of the through hole H7, which is one of wall portions that form the through hole H6. Accordingly, the rear cover 70 is restricted from moving in the upward direction, that is, in a vehicle height direction, relative to the front cover 60. In addition, because the width of the locking piece 743 in the front/rear direction (that is, the thickness of the locking piece 743) is equal to the width of the recessed portion 641 in the front/rear direction, the rear cover 70 is restricted from moving in the front/rear direction relative to the front cover 60. In addition, an outer surface of the rear end portion (i.e., a lengthwise-direction second end portion) of the front cover 60 and an outer surface of the front end portion (i.e., a lengthwise-direction end portion) of the rear cover 70 are coplanar with each other. The above-mentioned outer surfaces correspond to the surfaces that are visible from outside in a state where the roof rail 10 is assembled on the roof R.

The cover member 50, which includes the above-described configuration, is placed over the support member 20 in a manner that the support member 20 is covered with the cover member 50. First, the protruding portion 611d of the positioning portion 611 is inserted in the through hole H4. Next, the side wall portion 63 and the side wall portion 73 are pushed lightly in the downward direction, and thus the tab portions N are locked at the locking portions ST, respectively. In this state, an under surface of each of the leg portions F is in contact with an upper surface of the corresponding base portion B. As described above, the length of the protruding portion 611d in the vehicle front/rear direction is substantially equal to the length of the through hole H4 in the vehicle front/rear direction, and accordingly a front end portion (the positioning portion 611) of the front cover 60 is supported by the support member 20 so as not to be movable in the front/rear direction. That is, the front end portion (i.e., a lengthwise-direction first end portion) of the front cover 60 is fixed to the support member 20. Next, a nut NT1 is inserted in the clearance provided between the bottom plate portion Fa and the bottom plate portion Fb (refer to FIG. 5). A groove NTa is provided at an outer peripheral surface of the nut NT1. A left end portion of the bottom plate portion Fa and a right end portion of the bottom plate portion Fb are fitted in the groove NTa. Then, the screw SC1 is inserted in the through hole H1 from below the support member 20, and the screw SC1 is fastened to, that is, threadedly engaged with, the nut NT1. Because the left end portion of the bottom plate portion Fa and the right end portion of the bottom plate portion Fb are fitted in the groove NTa, the bottom plate portion Fa and the bottom plate portion Fb are not movable in an up/down direction relative to the nut NT1, however, the bottom plate portion Fa and the bottom plate portion Fb are movable in the vehicle front/rear direction. That is, the cover member 50 is restricted from moving in the up/down direction, however, a portion of the cover member 50 which is positioned rearward relative to the positioning portion 611 is allowed to move (to expand and contract, that is, shrink) in the front/rear direction.

The roof rail 10, which includes the above-described configuration, is assembled on the roof R with a spacer SP interposed between the roof rail 10 and the roof R, as will be described below (refer to FIG. 6). First, the roof rail 10 is mounted on the groove portion D. Next, the cap member CP is removed and the screw SC2 is inserted inside the cover member 50 from the through hole H5. Further, the screw SC2 is inserted in the through hole H2 and in the spacer SP. The nut NT2 is assembled to the inner panel R3 in advance, and the screw SC2 is screwed into the nut NT2. Because the through hole H2 is formed to be elongated in the front/rear direction, the position of the roof rail 10 in the front/rear direction relative to the roof R may be adjusted. For example, the roof rail 10 is placed so that a position of a front end of the roof rail 10 and a position of a front end of the roof R are matched with each other. Then, the cap member CP is attached to the upper wall portion 61 and the upper wall portion 71. In a state where the roof rail 10 is assembled on the roof R, the lower end portion of the lip member L is sandwiched between a lower end surface of each of the side wall portion 62, the side wall portion 63, the side wall portion 72 and the side wall portion 73, and an upper surface of the roof R. Accordingly, foreign material is restricted from coming in the groove portion D.

According to the roof rail 10 including the above-described configuration, the positioning portion 611, which determines the position of the front end portion of the front cover 60 in the front/rear direction relative to the support member 20, is provided at the front end portion of the front cover 60. Thus, by matching a front end of the front cover 60 with the front end of the roof R when the roof rail 10 is assembled on the roof R, difference between the position of the front end of the front cover 60 and the position of the front end of the roof R is small even in a case where the cover member 50 is expanded or contracted due to changes in an ambient temperature. Further, the portion, of the front cover 60, which is positioned rearward relative to the positioning portion 611, and the rear cover 70 are supported by the support member 20 to be movable (to be expandable and contractible) in the vehicle front/rear direction because the front end portion of the rear cover 70 is assembled to the rear end portion of the front cover 60. In a case where the front cover 60 and the rear cover 70 are fixed to the support member 20 (that is, in a case where the front cover 60 and the rear cover 70 are not expandable or contractible), when the front cover 60 and the rear cover 70 tend to expand or contract in the vehicle front/rear direction, an excessive force is applied to portions of the front cover 60 and the rear cover 70 respectively, the portions which are fixed to the support member 20. As a result, the front cover 60 and the rear cover 70 may be damaged. According to this embodiment, the portion, of the front cover 60, which is positioned rearward relative to the positioning portion 611, and the rear cover 70 are movable (expandable and contractible) in the vehicle front/rear direction. Therefore, the force that is attributed to the above-described expansion and contraction is scarcely applied to the front cover 60 and the rear cover 70, that is, the force which is applied to the front cover 60 and the rear cover 70 is decreased. Consequently, the front cover 60 and the rear cover 70 are restricted from being damaged. The front cover 60 and the rear cover 70 may be formed integrally with each other. In this case, however, a large size-metal mold is needed, which increases costs. Therefore, in this embodiment, the cover member 50 includes the separate covers, that is, the front cover 60 and the rear cover 70. In addition, the outer surface of the rear end portion of the front cover 60 and the outer surface of the front end portion of the rear cover 70 are positioned on an identical plane, that is, the outer surface of the rear end portion of the front cover 60 and the outer surface of the front end portion of the rear cover 70 are coplanar with each other. That is, a step is prevented from being formed at a boundary portion between the front cover 60 and the rear cover 70. Consequently, a quality of an external appearance of the roof rail 10 is enhanced, and an occurrence of wind noise is restricted.

This disclosure is not limited to the aforementioned embodiment, and may be appropriately changed or modified in various ways without departing from the scope of the disclosure.

For example, the front cover 60 and the rear cover 70 are fitted to, that is, engage with, each other in the aforementioned embodiment, however, the front cover 60 and the rear cover 70 may be connected to each other by using a fastener member including, for example, a screw. In addition, in the aforementioned embodiment, the protruding portion 611d of the positioning portion 611 is fitted by insertion in the through hole H4, and therefore the front cover 60 is supported by the support member 20 so as not to be movable in the front/rear direction relative to the support member 20. Alternatively, however, the positioning portion 611 may be fastened to the front end portion of the support member 20 by using a fastener member including, for example, a screw. In addition, in the aforementioned embodiment, the roof rail 10 is assembled on the groove portion D of the roof R. However, the roof rail 10 may be assembled on an upper surface of a roof having a planar configuration. In addition, in the aforementioned embodiment, the length of the front cover 60 differs from the length of the rear cover 70, however, the lengths of the front cover 60 and the rear cover 70 may be identical to each other. In addition, in the aforementioned embodiment, the length of the front support member 30 and the length of the rear support member 40 are identical to each other, however, the length of the front support member 30 and the length of the rear support member 40 may differ from each other.

According to the aforementioned embodiment, the roof rail 10 includes the support member 20 which is formed to be extended in the vehicle front/rear direction and is configured to be assembled on the upper surface of the roof R of the vehicle, the front cover 60 which is made from the synthetic resin material and is formed to be extended in the vehicle front/rear direction, the front cover 60 including the front end portion which is fixed to the support member 20 and the rear end portion which is supported by the support member 20 to be expandable and contractible in the vehicle front/rear direction, and the rear cover 70 which is made from the synthetic resin material and is formed to be extended in the vehicle front/rear direction, the rear cover 70 being supported by the support member 20 to be expandable and contractible in the vehicle front/rear direction, the rear cover 70 including the front end portion which is assembled to the rear end portion of the front cover 60, wherein the outer surface of the rear end portion of the front cover 60 and the outer surface of the front end portion of the rear cover 70 are coplanar with each other, The "front end portion" (i.e., the lengthwise-direction first end portion) of the front cover 60 corresponds not only to the end portion of the front cover 60, but the "front end portion" includes the portion of the front cover 60, which is positioned at an intermediate portion-side of the front cover 60 relative to the front end portion in the vehicle front/rear direction. That is, the front end portion includes the portion of the front cover 60, which is positioned closer to the intermediate portion-side of the front cover 60 to some extent. In addition, "be fixed" includes a state where the front end portion of the front cover 60 is supported so as not to be movable in the vehicle front/rear direction. In addition, the "outer surface" corresponds to the surface which is visible from outside in a state where the front cover 60 and the rear cover 70 are placed over the support member 20 in a manner that the support member 20 is covered with the front cover 60 and the rear cover 70.

According to the aforementioned embodiment, the rear end portion of the front cover 60 is provided with the fitting portion 64 and the front end portion of the rear cover 70 is provided with the fitting portion 74, and the fitting portions 64 and 74 engage with each other.

According to the aforementioned embodiment, the fitting portion 74 includes the locking piece 741 and the locking piece 742 which restrict the rear cover 70 from moving in the vehicle height direction relative to the front cover 60, and the locking piece 743 which restricts the rear cover 70 from moving in the vehicle front/rear direction relative to the front cover 60. The fitting portion 64 includes the through hole H6 and the through hole H7 which restrict the rear cover 70 from moving in the vehicle height direction relative to the front cover 60, and the recessed portion 641 which restricts the rear cover 70 from moving in the vehicle front/rear direction relative to the front cover 60.

According to the above-described configuration, the front end portion of the front cover 60 relative to the support member 20 is fixed to the support member 20. Thus, by matching an end (for example, the front end) of the front cover 60 with an end (for example, the front end) of the roof R when the front cover 60 is assembled on the roof R, the difference or gap between the position of the end of the front cover 60 and the position of the end of the roof R is small even in a case where the front cover 60 is expanded or contracted due to the changes in the ambient temperature. Further, the front end portion of the rear cover 70 is assembled to the rear end portion of the front cover 60, and the rear end portion of the front cover 60, and the rear cover 70 are supported by the support member 20 to be expandable and contractible in the vehicle front/rear direction. In a case where the front cover 60 and the rear cover 70 are fixed to the support member 20 (that is, in a case where the front cover 60 and the rear cover 70 are not expandable or contractible), when the front cover 60 and the rear cover 70 tend to expand or contract in the vehicle front/rear direction, the excessive force is applied to the portions, which are fixed to the support member 20, of the front cover 60 and the rear cover 70. As a result, the front cover 60 and the rear cover 70 may be damaged. According to the above-described configuration, the rear end portion of the front cover 60, and the rear cover 70 are expandable and contractible in the vehicle front/rear direction. Therefore, the force that is attributed to the above-described expansion and contraction is scarcely applied to the front cover 60 and the rear cover 70. Consequently, the front cover 60 and the rear cover 70 are restricted from being damaged. The front cover 60 and the rear cover 70 may be formed integrally with each other. In this case, however, the large size-metal mold is needed, which increases the costs. Therefore, according to the above-described configuration, the cover member 50 includes the separate covers, that is, the front cover 60 and the rear cover 70. In addition, the outer surface of the rear end portion of the front cover 60 and the outer surface of the front end portion of the rear cover 70 are positioned on the identical plane, that is, the outer surface of the rear end portion of the front cover 60 and the outer surface of the front end portion of the rear cover 70 are coplanar with each other. That is, the step is prevented from being formed at the boundary portion between the front cover 60 and the rear cover 70. Consequently, the quality of the external appearance of the roof rail 10 is enhanced, and the occurrence of the wind noise is restricted.

According to the aforementioned embodiment, the front cover 60 includes the length in the vehicle front/rear direction, which differs from the length of the rear cover 70 in the vehicle front/rear direction.

According to the above-described configuration, a position of the rear end portion of the front cover 60 and the front end portion of the rear cover 70 may be arranged to match with, for example, a position of a center pillar of a door of the vehicle. Consequently, an aesthetic quality or a design property of the vehicle is enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof rail comprising:
a support member which is formed to be extended in a vehicle front/rear direction and is configured to be assembled on an upper surface of a roof of a vehicle;
a first cover which is made from synthetic resin material and is formed to be extended in the vehicle front/rear direction, the first cover including a lengthwise-direction first end portion which is fixed to the support member and a lengthwise-direction second end portion which is supported by the support member to be expandable and contractible in the vehicle front/rear direction; and
a second cover which is made from synthetic resin material and is formed to be extended in the vehicle front/rear direction, the second cover being supported by the support member to be expandable and contractible in the vehicle front/rear direction, the second cover including a lengthwise-direction end portion which is assembled to the lengthwise-direction second end portion of the first cover, wherein
an outer surface of the lengthwise-direction second end portion of the first cover and an outer surface of the lengthwise-direction end portion of the second cover are coplanar with each other.

2. The roof rail according to claim 1, wherein each of the lengthwise-direction second end portion of the first cover and the lengthwise-direction end portion of the second cover is provided with a fitting portion, and the fitting portions engage with each other.

3. The roof rail according to claim 2, wherein each of the fitting portions includes a first restriction portion which restricts the second cover from moving in a vehicle height direction relative to the first cover and a second restriction portion which restricts the second cover from moving in the vehicle front/rear direction relative to the first cover.

4. The roof rail according to claim 1, wherein the first cover includes a length in the vehicle front/rear direction, which differs from a length of the second cover in the vehicle front/rear direction.

5. The roof rail according to claim 1, wherein a positioning hole is provided at the support member, and a positioning portion is provided at the lengthwise-direction first end portion of the first cover, the positioning portion being inserted in the positioning hole such that the lengthwise-direction first end portion of the first cover is fixed to the support member.

6. The roof rail according to claim 3, wherein the first restriction portion includes a through hole and a locking piece, and the second restriction portion includes a recessed portion and a locking piece.

7. The roof rail according to claim 6, wherein a positioning hole is provided at the support member, and a positioning portion is provided at the lengthwise-direction first end portion of the first cover, the positioning portion being inserted in the positioning hole such that the lengthwise-direction first end portion of the first cover is fixed to the support member.

* * * * *